US007673249B2

(12) United States Patent
Awada et al.

(10) Patent No.: US 7,673,249 B2
(45) Date of Patent: *Mar. 2, 2010

(54) USER CUSTOMIZATION OF CHARACTER SETS OF MENU ITEMS

(75) Inventors: Faisal M. Awada, Round Rock, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/014,197

(22) Filed: Jan. 15, 2008

(65) Prior Publication Data

US 2008/0178106 A1     Jul. 24, 2008

Related U.S. Application Data

(63) Continuation of application No. 10/418,501, filed on Apr. 17, 2003, now Pat. No. 7,328,409.

(51) Int. Cl.
*G06F 13/00*     (2006.01)
*G06F 15/00*     (2006.01)

(52) U.S. Cl. ........................ 715/765; 715/810; 715/851

(58) Field of Classification Search ......... 715/763–765, 715/851, 810, 779–781, 843, 825–826, 841–845
See application file for complete search history.

(56) References Cited

U.S. PATENT DOCUMENTS

| 6,938,216 B1 * | 8/2005 | Ishisaki ...................... 715/817 |
| 7,047,501 B2 * | 5/2006 | Morcos et al. .............. 715/779 |
| 7,454,714 B2 * | 11/2008 | Totman et al. .............. 715/841 |

* cited by examiner

*Primary Examiner*—Kevin Nguyen
(74) *Attorney, Agent, or Firm*—Stephen J. Walder, Jr.; David A. Mims, Jr.

(57) ABSTRACT

Mechanisms are disclosed that enable a user to customize selection elements of a GUI. For example, menu entries in a GUI can be customized so that the user can specify the font, the language, character sets, color, and other attributes of the text of one menu item (or less than all menu items); to have the ability to selectively activate multimedia options associated with selected menu items (e.g., to play a sound whenever the cursor/pointer passes over a particular menu item); and/or to assign an animation sequence that is unique to selected menu items. The menu item properties are defined by the user, using, for example, a dialog box that allows specification of the attributes. When the application is installed, a default set of menu item properties is defined by the software manufacturer, which can be further customized by the user.

18 Claims, 5 Drawing Sheets

USER CUSTOMIZATION OF CHARACTER SETS OF MENU ITEMS

CROSS-REFERENCE TO RELATED APPLICATIONS

This is a continuation of U.S. application Ser. No. 10/418,501 filed Apr. 17, 2003, the entire contents of which is hereby incorporated by reference.

FIELD OF THE INVENTION

This invention relates to personal computer systems and, more particularly, to a method, system, and computer program product for improving a graphical user interface (GUI) on a personal computer system and the use thereof.

BACKGROUND OF THE INVENTION

In recent years, virtually all personal computers and workstations have adopted a graphical user interface (GUI) environment, which allows a user to manage the system and execute applications using a "point-and-click" method on objects shown on the computer display. The main GUI background is commonly referred to as the "desktop", and these objects typically include graphic icons, which represent some software application or function, and windows, which divide the desktop into different areas on the display for different applications.

It is well known in the art that with GUI systems, the computer system can be controlled using a pointing device such as a mouse. The pointing device controls the location of a pointer that appears on the screen of the computer's display device. Icons, windows, menus, etc. (referred to generically as "selection elements" herein) may be manipulated using the mouse or keyboard. In this way, underlying devices, programs, etc. which correspond to the selection elements may be controlled.

Typical GUI systems employ menus that are displayed to give the user of the GUI additional control and functionality options. For example, most versions of the Windows operating system by Microsoft Corporation currently in use today (e.g., Windows 98, Windows 2000, Windows XP) have a "start menu" comprising a "start button" that, when activated, displays a menu of general selection items. These items may include programs installed on the computer, selections to allow configuration of the system (e.g., "settings"), search options, help options, and the like. Further, most programs operating in a GUI environment such as Windows include drop-down menus that give the user of the program additional control and functionality options. Such menus, and other types of menus, are pervasive in the GUI environment and frequently cascade, i.e., generate sub-menus from a primary menu. Such menu systems have substantially improved the ease of use of computer systems so that those without technical training can easily use computer systems for powerful computing tasks.

A user of a program/GUI has selectable options for display of the GUI environment, including for the menu selections. For example, various audio and visual "schemes" are available (different backgrounds, border colors, text sizes, text colors, languages, sounds, etc.) and these schemes can be selected by the user from a "preferences" menu, from a "control panel" within the program, or through other selection options. The selection of a particular scheme affects the entire GUI display globally.

Rather than selecting a particular scheme that affects the entire GUI display, users may also separately select preferences for individual aspects of the display, such as just the font size, just the colors, etc. While this enhances the use of the system for the user, the user does not have the ability to select a portion of a display aspect, e.g., a single menu item (or less than all menu items), and change only the appearance of the selected portion. Thus, if one font size is used for one menu item, it must be used for all menu items. Similarly, the same character set, language, color, etc. must be used for all elements, thereby limiting the selections available to the selections made by the current user of the system. Thus, for example, in a public library, if it is desired to have accessibility to an English language character set for designating an English-language word processor selection, and also have available a setting in a Kanji character set for designating a Japanese-language word processing system, this cannot be accomplished using prior art technology. Either all of the text will be in English characters or all of the text will be in Kanji characters.

It would be beneficial to have the ability to selectively choose display characteristics for selection elements, and in particular, menu items, on an individual, rather than collective basis.

SUMMARY OF THE INVENTION

The present invention is a method, system, and computer program product that enables a user to customize a selection element (such as a menu entry) so that the user can specify the font, the language, character sets, color, and other attributes of the text of one selection element (or a subset less than all selection elements); to have the ability to selectively activate multimedia options associated with selected selection elements (e.g., to play a sound whenever the cursor/pointer passes over a particular menu item); and/or to assign an input direction for inputting of text for a selection element that is unique to selected selection elements.

The selection element properties are defined by the user, using, for example, a dialog box that allows specification of the attributes. When the application is installed, a default set of selection element properties is defined by the software manufacturer, which can be further customized by the user.

DETAILED DESCRIPTION OF THE INVENTION

Figure 1:
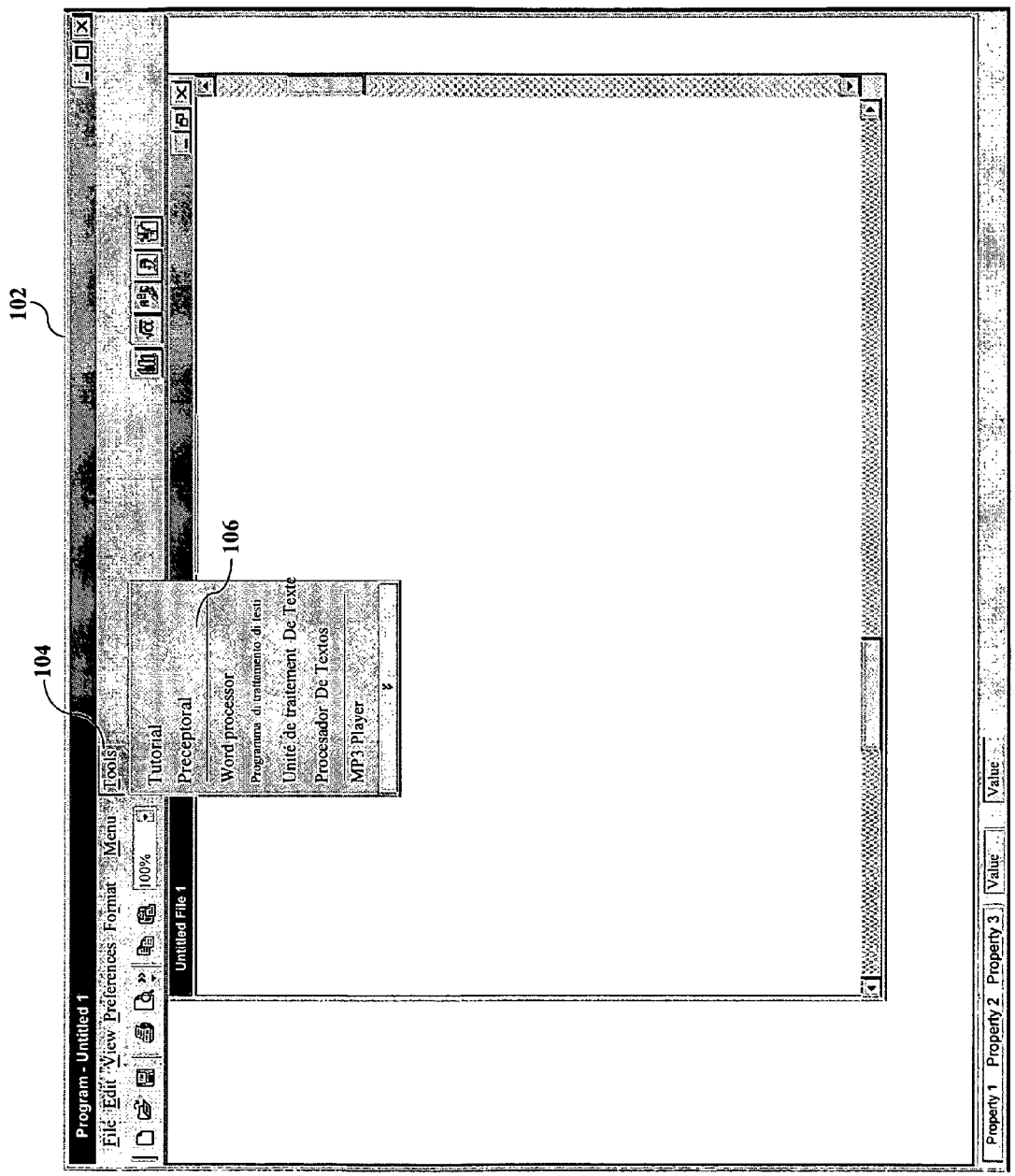
FIG. 1 illustrates a typical GUI window 102 as it might be displayed on a typical computer system.

The present invention will be described in connection with FIGS. 1 through 5, directed to menu selection elements. It is understood that the present invention is not limited to menu selection elements and includes all types of selection elements, including icons, windows, buttons, etc. Referring to FIG. 1, a typical GUI window 102 as it might be displayed on a typical computer system is illustrated. GUI window 102 can be a display generated by a web browser, word processor, or any other program that utilizes menu structures in a graphical display environment.

A menu selection 104 ("Tools") is seen in a selected state, with the selection of the Tools menu option causing drop-down menu 106 to be displayed. As can be seen in FIG. 1, drop-down menu 106 shows various selectable options in multiple languages. For example, the first menu selection is "Tutorial" and the second menu selection is the Spanish language equivalent, "Preceptoral". Next, the English language term "Word processor" is followed by Italian ("Programma di trattamento di testi"), French ("Unitéde traitement De Texte"), and Spanish ("Procesador De Textos"). Following that, a menu selection for "MP3 Player" appears.

Although not shown, if desired, rather than having multiple options for the same selection (e.g., a word processor selection in English, Italian, French, and Spanish), in accordance with the present invention, the menu can be configured to display a single item in one language (e.g., "Word Processor" only in French), and another selection in a different language (e.g., "Tutorial" only in English). Further, although not shown in FIG. 1, if it is desired to display a particular selection in a particular character set (e.g., in Japanese Kanji characters), in accordance with the present invention, any menu item can be displayed in an alternate character set without affecting the character displays for the other menu items. In addition, if the menu selection includes a text input field, the selected language attributes apply to the text being entered by the user. Thus, for example, if a menu item is selected in Hebrew, the corresponding input method for the present input field automatically places the text cursor on the right side of the input field, and moves to the next character position to the left as the user types characters on the keyboard.

Further, although not shown in FIG. 1, if it is desired to display a particular selection in a single language, the menu can be configured so that, if the pointer remains stationary for a predetermined period of time over that menu selection, the text of the menu selection changes to an alternate language, and continues to cycle through each of the configured language sets. Thus, for example, upon pointing to the "Tutorial" item in drop-down menu 106, after a predetermined time period (e.g., two seconds) the text of the selection over which the mouse pointer is hovering could automatically change to the first alternate language (i.e., "Preceptoral" in Spanish), and would continue to automatically cycle through the selected languages using the specified time period for each language. Using these schemes reduces the desktop "real estate" consumed by the menu items. Clicking of the mouse while viewing the desired language option causes the selection being viewed at the time of the mouse-click to be selected.

Further, in accordance with the present invention, if desired, a particular menu item may be associated with a particular sound, so that, for example, if a user hovers a mouse pointer over the "MP3 Player" menu selection, an audio selection (e.g., music, chimes, or other sounds) can be played through the sound system of the computer to indicate that the menu selection will play music.

Figure 2:
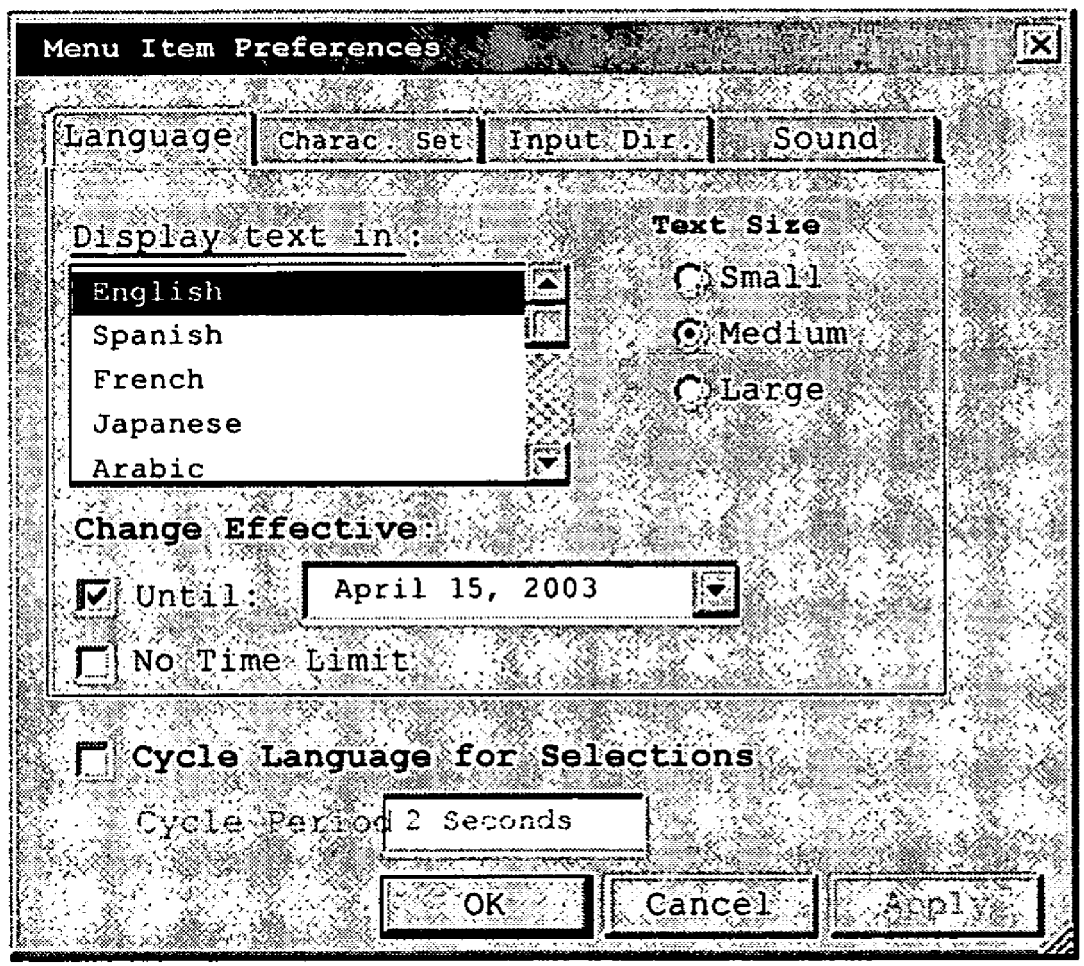
FIG. 2 illustrates a drop-down menu which might appear upon the "right-clicking" of a particular menu item displayed on the GUI screen.
Figure 3:
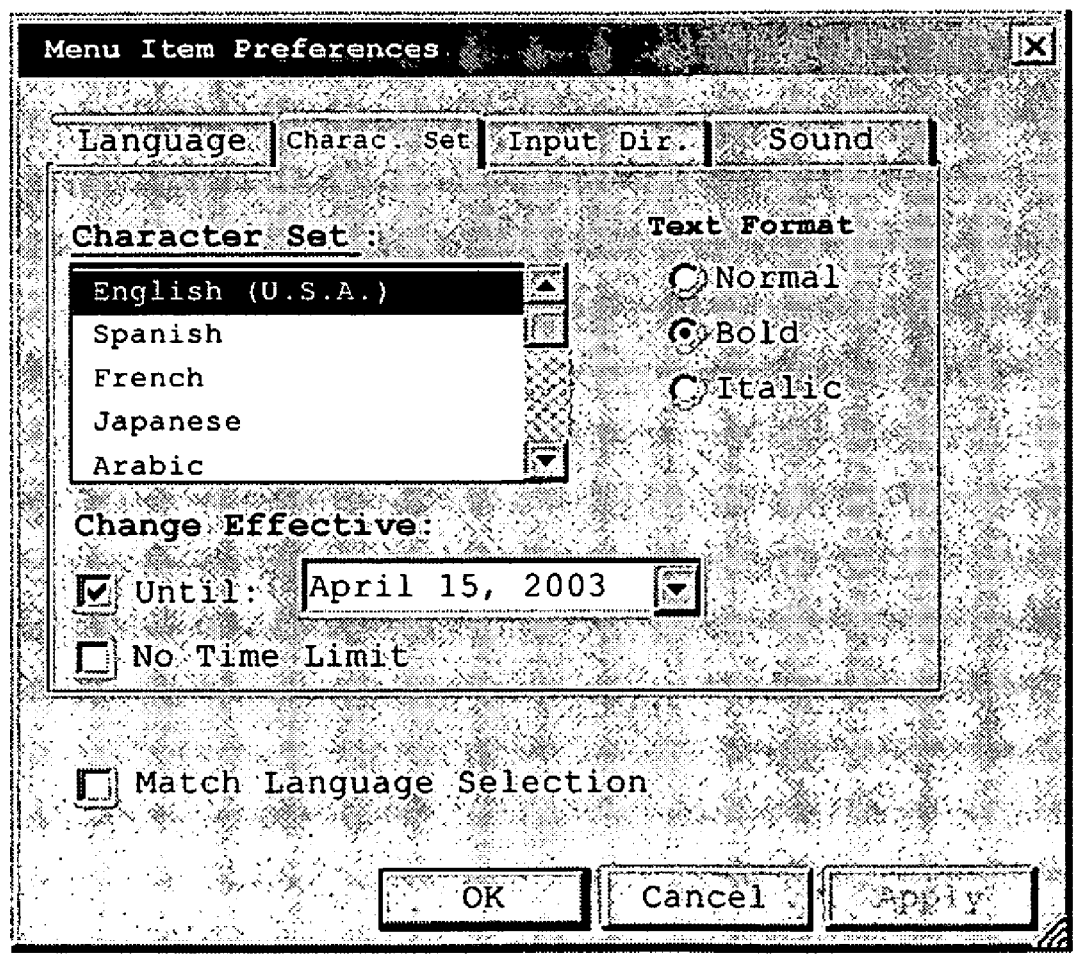
FIG. 3 illustrates the same menu of FIG. 2, but with the "Character Set" tab selected.
Figure 4:
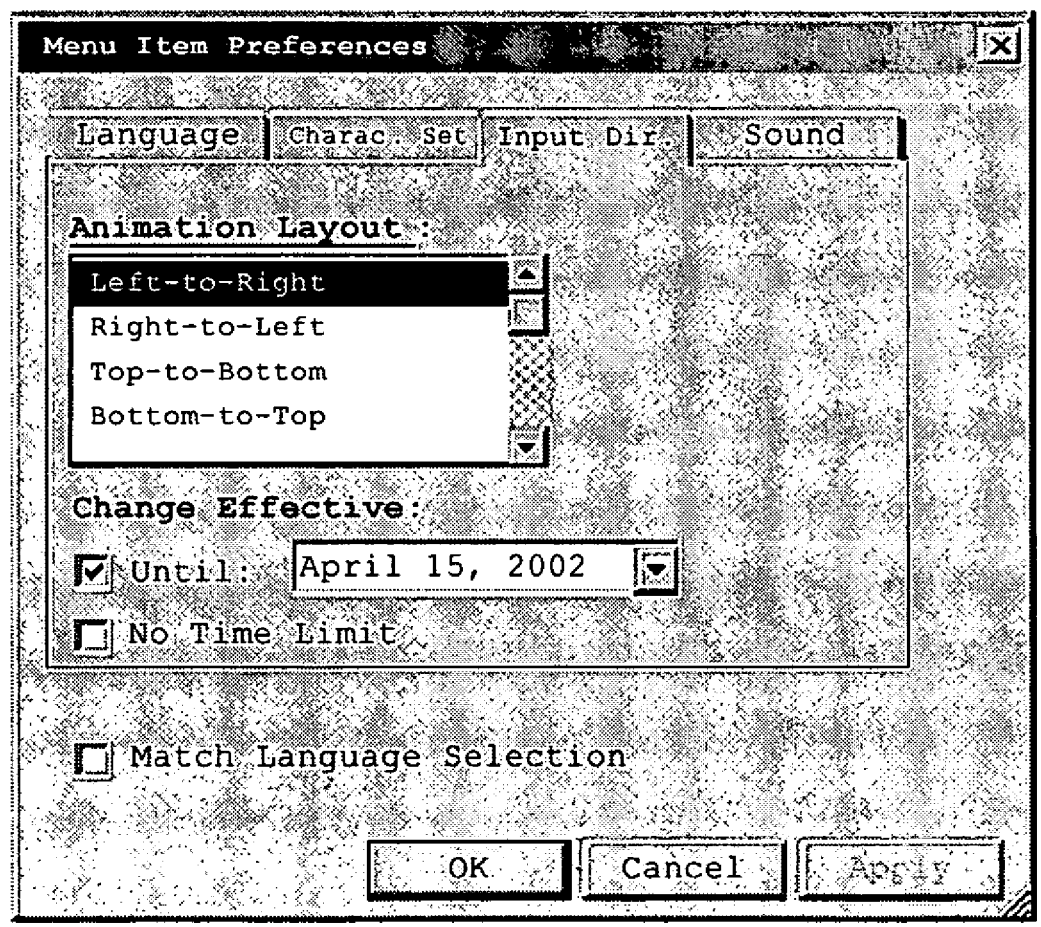
FIG. 4 illustrates the "Input Direction" tab of the example menu item preferences screen.

FIGS. 2-4 illustrate one method of selecting the various options for a particular menu item. It is understood that these illustrations are given for purposes of example only and that numerous other methods can be used to perform the selection process. Referring to FIG. 2, a drop-down menu is illustrated which might appear upon the "right-clicking" of a particular menu item (e.g., "Tutorial" in FIG. 1) displayed on the GUI screen. The menu illustrated in FIG. 2 might be displayed immediately upon right-clicking the selected menu item, or it might be displayed upon selection of an option from a cascading menu that is opened when the target menu item is selected. In any case, as shown in FIG. 2, in this example the user has four tabbed options for selecting preferences for the target menu item: Language; Character Set; Input Direction; and Sound.

FIG. 2 shows the "Language" tab selected, which gives the option to the user of displaying the text in various languages (English, Spanish, French, Japanese, and Arabic are shown) and also gives the user the ability to select the text size and select the duration of the change being made to the menu item. For example, FIG. 2 illustrates a selection that indicates that the change to the text display will remain effective until Apr. 15, 2003. The user can be given a list of options (one week, one day, one month, etc.) and/or can be given the opportunity to input a specific date. Alternatively, the user is also given the option of checking off the "No Time Limit" box, which means that the change will remain effective until changed again. It is contemplated that if the user selects a limited effective period, that the menu item will revert back to a default value once the limiting date has been reached.

Also shown in FIG. 2 is the "Cycle Language for Selections" option (illustrated in FIG. 2 in an "unchecked" status). Checking the "Cycle Language for Selections" checkbox enables the above-described option of cycling the display of alternate languages for text over which a mouse pointer is being hovered or otherwise designated. When the "Cycle Language for Selections" option is checked, the user is given the ability to change the cycle period to a desired time (in FIG. 2, "two seconds" has been selected as the cycle time). As is well known, the user may select from pre-set cycle periods and/or be given the option of inputting a desired cycle period.

Thus, the user is able to select, from a drop-down menu such as that illustrated in FIG. 2, from among multiple display options for a single selection item. In other words, by bringing up the menu of FIG. 2, the user is able to select multiple menu displays for a single menu item. Known translation software can be utilized to automatically translate the menu items and make them available; alternatively, alternate language selections can be pre-programmed so that they are selectable from a drop-down menu or other known selection tool.

FIG. 3 illustrates the same menu of FIG. 2, but with the "Character Set" tab selected. Here, the user is given the option of selecting from one of multiple character sets (illustrated are Latin, Arabic, Hebrew, Traditional Chinese, Urdu). The user is also given the ability to select a font from among the various supported fonts, such as Normal font, Bold font, and Italic font, and, as with the changes made with FIG. 2, is given the ability to set an effective date for the duration of the change to the menu item. Further, FIG. 3 illustrates the ability of the user to select a "Match Language Selection" preference option, which gives the user the ability to select a character set that is associated with the language selected from the Language drop-down menu. Thus, for example, if the user selects the Japanese language in the Language drop-down menu, and then selects "Match Language Selection" in the Character Set drop-down menu, the system can be configured to display the text automatically in Japanese Kanji characters.

FIG. 4 illustrates the "Input Direction" tab of the example menu item preferences screen. Here, the user is given the ability to select the Input Direction for text input boxes that may be shown upon selection of a particular menu item. Thus, for example, if the language selected typically displays text from left to right, as in English, the input direction for text input boxes will automatically revert to left-to-right unless changed by the user. Likewise, if Hebrew is selected as the character set, then the input direction can automatically be set to display the text in right-to-left format unless changed. Similar to the illustration of FIG. 3, the illustration of FIG. 4 gives the user the ability to click a "Match Language Selection" option, which will automatically select an input direction associated with the particular language that has been selected.

Figure 5:
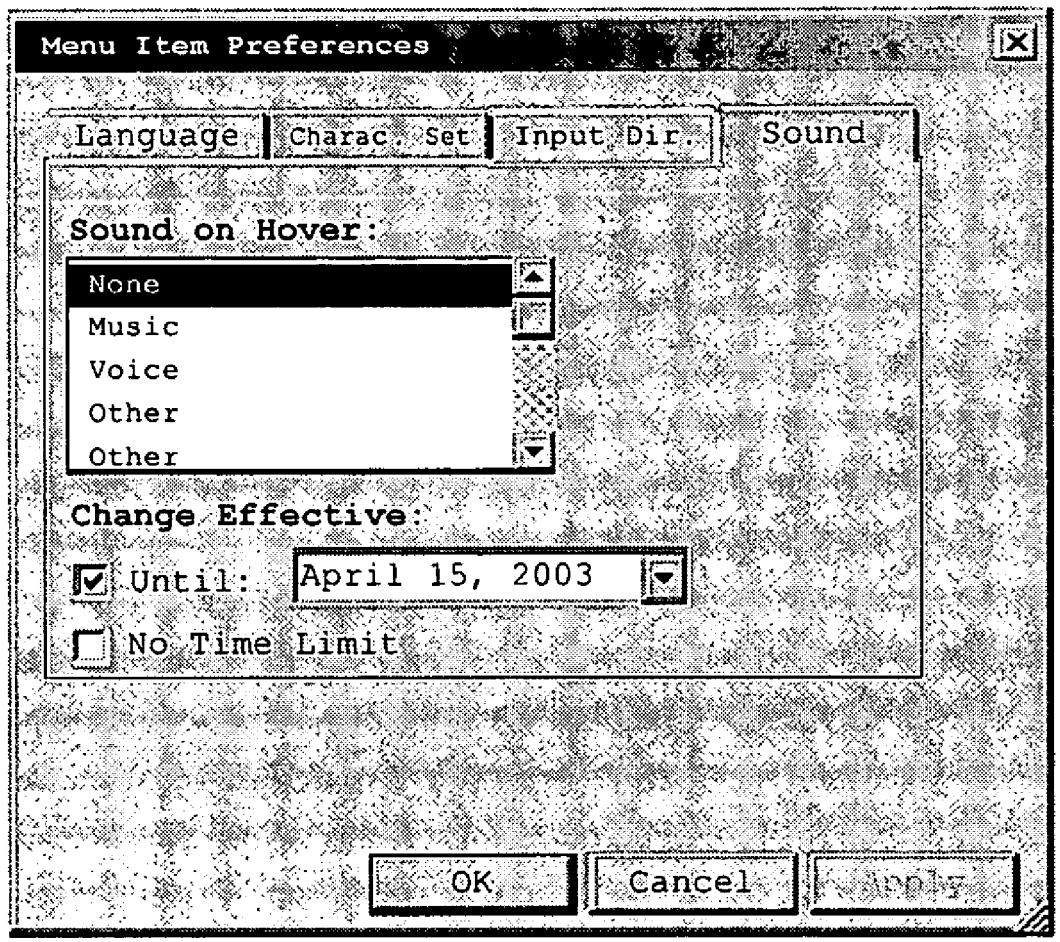
FIG. 5 illustrates the "Sound" tab of the menu item preferences menu.

FIG. 5 illustrates the Sound tab of the menu item preferences menu. In this illustration, the user is given the ability to select a sound to be associated with a menu item upon hovering the mouse pointer over the menu item, where the particular sound corresponds to the language of the menu item. The default is "None", but the user can also play sound (for example, voice cues in a particular language to indicate to a user that the program associated with the checkbox menu item will play audio corresponding to the selected language; voice cues that give an indication that, for example, the program over which the mouse pointer is hovering will provide text-to-voice capability; music, to indicate that the program will play music files). In addition, selecting a menu item for a text field can play audio in a language corresponding to the language in which text should be entered.

The menus illustrated in FIGS. 2-5 are for the purpose of example only. It is understood that there are numerous methods for selection of preferences as is well known in the art. For example, the user can, instead of right-clicking on a desired menu item, go to a "Control Panel" or other similar control function available in the operating system, and select the various options from an element in the control panel devoted to this task, just like there are elements in the control panel devoted to other tasks.

In one embodiment of the present invention, hovering on a particular menu item can trigger the display of a "pop-up" menu that displays the various selections available in alternative language/character sets, essentially "translating" the particular menu item for the user. In addition, as noted above, the examples illustrated in FIGS. 1-5 focus on the change of languages with respect to menus. However, it is understood that the claims of the present invention are intended to cover any type of selective customization of individual selection elements, such as icons, windows, buttons, and the like. Thus, for example, the language displayed on a particular icon can be set to be a different language than text associated with a different icon; further, sound elements and color schemes may be associated with a single icon while not associated with other icons.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation on which the GUI is stored. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-5 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of customizing a GUI display, said GUI display including one or more types of selection elements, each of said of selection elements types having customizable attributes, said method comprising the steps of:
   selecting, via a user input device, a selection element in a menu of the GUI, wherein the selection element is one of a plurality of selection elements in the GUI; and
   modifying at least one customizable attribute of said selected selection element, wherein said modification of said at least one customizable attribute modifies the at least one customizable attribute only of said selected selection element and does not affect customizable attributes of other selection elements in the plurality of selection elements in the GUI, and wherein the at least one customizable attribute of the selected selection element comprises a character set for text displayed as part of the selected selection element, and wherein at least one other selection element in the plurality of selection elements in the GUI utilizes a different character set from that of the selected selection element.

2. The method of claim 1, wherein
the at least one customizable attribute further comprises a language for text to be displayed as part of the selected selection element.

3. The method of claim 1, wherein
the at least one customizable attribute further comprises a font size for text to be displayed as part of the selected selection element.

4. The method of claim 1, wherein
the at least one customizable attribute further comprises a font attribute for text to be displayed as part of the selected selection element.

5. The method of claim 1, wherein
the at least one customizable attribute further comprises a sound associated with text to be output as part of an operation of the selected selection element.

6. The method of claim 1, wherein the at least one customizable attribute further comprises a duration of a modification to another customizable attribute of the selected selection element.

7. A system of customizing a GUI display, said GUI display including one or more types of selection elements, each of said of selection elements types having customizable attributes, said system comprising:

means for selecting a selection element in a menu of the GUI, wherein the selection element is one of a plurality of selection elements in the GUI; and means for modifying at least one customizable attribute of said selected selection element, wherein said means for modification of said at least one customizable attribute modifies the at least one customizable attribute only of said selected selection element and does not affect customizable attributes of other selection elements in the plurality of selection elements in the GUI, and wherein the at least one customizable attribute of the selected selection element comprises a character set for text displayed as part of the selected selection element, and wherein at least one other selection element in the plurality of selection elements in the GUI utilizes a different character set from that of the selected selection element.

8. The system of claim 7, wherein the at least one customizable attribute further comprises a language for text to be displayed as part of the selected selection element.

9. The system of claim 7, wherein the at least one customizable attribute further comprises a font size for text to be displayed as part of the selected selection element.

10. The system of claim 7, wherein the at least one customizable attribute further comprises a font attribute for text to be displayed as part of the selected selection element.

11. The system of claim 7, wherein the at least one customizable attribute further comprises a sound associated with text to be output as part of an operation of the selected selection element.

12. The system of claim 7, wherein the at least one customizable attribute further comprises a duration of a modification to another customizable attribute of the selected selection element.

13. A computer program product for customizing a GUI display stored on computer-readable medium, said GUI display including one or more types of selection elements, each of said of selection elements types having customizable attributes, said computer program product comprising:

computer-readable code for selecting a selection element in a menu of the GUI, wherein the selection element is one of a plurality of selection elements in the GUI;

computer-readable code for modifying at least one customizable attribute of said selected selection element, wherein said modification of said at least one customizable attribute modifies the at least one customizable attribute only of said selected selection element and does not affect customizable attributes of other selection elements in the plurality of selection elements in the GUI, and wherein the at least one customizable attribute of the selected selection element comprises a character set for text displayed as part of the selected selection element, and wherein at least one other selection element in the plurality of selection elements in the GUI utilizes a different character set from that of the selected selection element.

14. The computer program product of claim 13, wherein the at least one customizable attribute further comprises a language for text to be displayed as part of the selected selection element.

15. The computer program product of claim 13, wherein the at least one customizable attribute further comprises a font size for text to be displayed as part of the selected selection element.

16. The computer program product of claim 13, wherein the at least one customizable attribute further comprises a font attribute for text to be displayed as part of the selected selection element.

17. The computer program product of claim 13, wherein the at least one customizable attribute further comprises a sound associated with text to be output as part of an operation of the selected selection element.

18. The computer program product of claim 13, wherein the at least one customizable attribute further comprises a duration of a modification to another customizable attribute of the selected selection element.

* * * * *